(12) United States Patent
Anson et al.

(10) Patent No.: US 8,161,201 B2
(45) Date of Patent: Apr. 17, 2012

(54) METHODS AND SYSTEM FOR CONFIGURING A PERIPHERAL DEVICE WITH AN INFORMATION HANDLING SYSTEM

(75) Inventors: Douglas M. Anson, Dripping Springs, TX (US); Yuan-Chang Lo, Austin, TX (US); William Dale Todd Nix, Austin, TX (US); Clint H. O'Connor, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 12/476,755

(22) Filed: Jun. 2, 2009

(65) Prior Publication Data

US 2010/0306418 A1  Dec. 2, 2010

(51) Int. Cl.
*G06F 3/00* (2006.01)
*G06F 13/00* (2006.01)
(52) U.S. Cl. .................. 710/15; 710/8; 710/33; 710/36
(58) Field of Classification Search .................. None
See application file for complete search history.

(56) References Cited

U.S. PATENT DOCUMENTS

| 2005/0117719 | A1* | 6/2005 | Hyotani et al. | 379/90.01 |
| 2008/0060033 | A1 | 3/2008 | Xiao | |
| 2009/0248906 | A1* | 10/2009 | Yamada | 710/9 |

FOREIGN PATENT DOCUMENTS

EP  1785844 A1  5/2007

OTHER PUBLICATIONS

Yuedong et al, Network-attached Smart Peripherals for Loosely Coupled Grid Computer, 2005, ieeexplore.org [online, accessed on Jan. 16, 2011], URL: http://ieeexplore.ieee.org/stamp/stamp.jsp?arnumber=01592323.*

* cited by examiner

*Primary Examiner* — Scott Sun
(74) *Attorney, Agent, or Firm* — Garrana Tran LLP; Andrea E. Tran

(57) ABSTRACT

A method for configuring a peripheral device in communication with an information handling system (IHS) is disclosed, wherein the method includes receiving visual data associated with the peripheral device and mapping configuration data to the peripheral device based on the visual data. The method further includes utilizing the configuration data to configure the peripheral device in communication with the IHS. An information handling system (IHS) in communication with an image capturing device is further disclosed including a storage device operable to store a database, the database configured to store a standard image of a peripheral device, wherein the standard image is associated with configuration data for the peripheral device. The system further includes a memory coupled to the storage device and a processor to receive visual data associated with the peripheral device from the image capturing device. The processor is operable to execute a software application configured to match the visual data with the standard image to configure the peripheral device based on the configuration data.

19 Claims, 4 Drawing Sheets

METHODS AND SYSTEM FOR CONFIGURING A PERIPHERAL DEVICE WITH AN INFORMATION HANDLING SYSTEM

TECHNICAL FIELD

The present disclosure relates generally to the field of information handling systems, and more specifically, to configuring a peripheral device with an information handling system.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Furthermore, many peripheral devices, such as mice, keyboards, cellular devices, and/or the like, have been created to interact with IHSs. Typically, such a peripheral device must be configured with the IHS with specific configuration data to function appropriately as intended. For example, different mice from different manufacturers may require different drivers to function properly with an IHS running a Windows operating system (OS). Furthermore, mice of the same manufacturer but of different models may also require different configuration data. Similar situations may also exist for any other type of peripheral device.

Therefore, a user is often required to search for the correct configuration data and install it onto the IHS. Such a process can imply having to manage through various installation wizards, knowing specific properties of the peripheral device, loading the correct software, and/or the like. The process of searching for the appropriate configuration data can be time consuming and cause considerable frustration for the user. Furthermore, there exists no guarantee that the user will locate the correct configuration data, which may lead to an inability of the peripheral device to connect with the IHS.

Current methods for alleviating the need for user interaction in configuring peripheral devices to the IHS all include placing special indicators on the peripheral device. For example, Microsoft Surface employs stick on dot patterns to recognize devices. As such, in order to be compatible with Microsoft Surface, the device must include a stick on dot pattern somewhere on its surface and is thus limited in this manner. Other methods use similar ideas but may instead employ radio tags and/or bar codes on the peripheral device.

Thus, a need exists for systems, and methods for automatically configuring a peripheral device with an IHS without having to place a specific indicator on the peripheral device.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows. An aspect of the disclosure provides a method for configuring a peripheral device in communication with an information handling system (IHS). The method includes receiving visual data associated with the peripheral device and mapping configuration data to the peripheral device based on the visual data. The method further includes utilizing the configuration data to configure the peripheral device in communication with the IHS.

An aspect of the disclosure provides a method for configuring a peripheral device in communication with an information handling system (IHS). The method includes receiving visual data associated with the peripheral device and mapping configuration data to the peripheral device based on the visual data. The method further includes utilizing the configuration data to configure the peripheral device in communication with the IHS.

Another aspect of the disclosure provides an information handling system (IHS) in communication with an image capturing device. The system includes a storage device operable to store a database, the database configured to store a standard image of a peripheral device, wherein the standard image is associated with configuration data for the peripheral device. The system further includes a memory coupled to the storage device, and a processor to receive visual data associated with the peripheral device from the image capturing device. The processor may be operable to execute a software application configured to match the visual data with the standard image to configure the peripheral device based on the configuration data.

Yet another aspect of the disclosure provides a method for configuring a peripheral device in communication with an information handling system (IHS). The method including receiving visual data associated with the peripheral device and matching the visual data with a standard image of the peripheral device, wherein the standard image is associated with configuration data. The method further includes utilizing the configuration data to configure the peripheral device in communication with the IHS.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
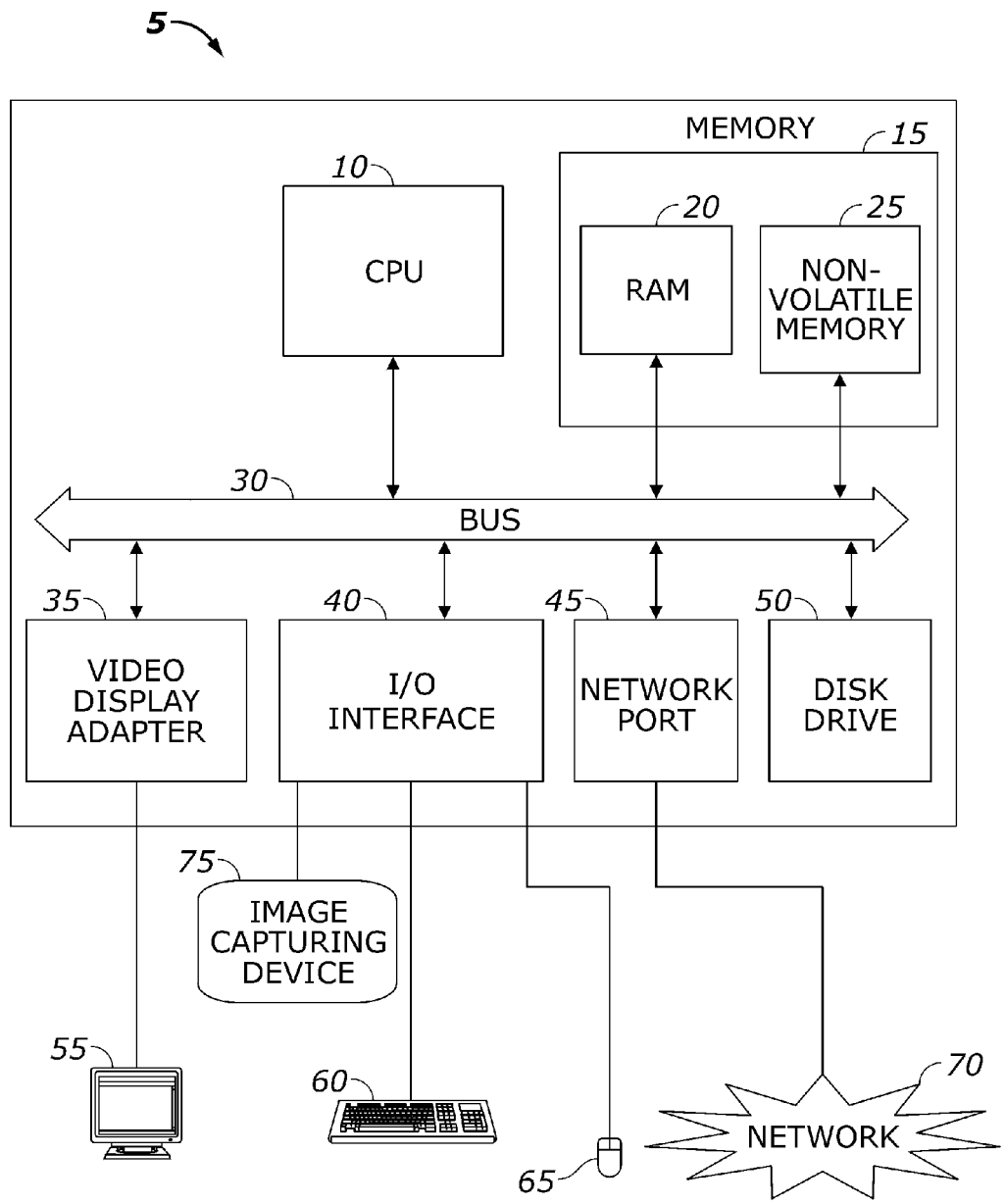
FIG. 1 represents an information handling system (IHS) in accordance with one aspect of the present disclosure.

Before the present systems, methods, and computer-readable mediums are described, it is to be understood that this disclosure is not limited to the particular, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a database" refers to one or several databases and reference to "a method of configuring" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). In addition, an image capturing device 75 may be coupled to the I/O Interface 65. As such, the image capturing device 75 may be operable to capture visual data associated with various objects and transfer the visual data to other components of the IHS 5. The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
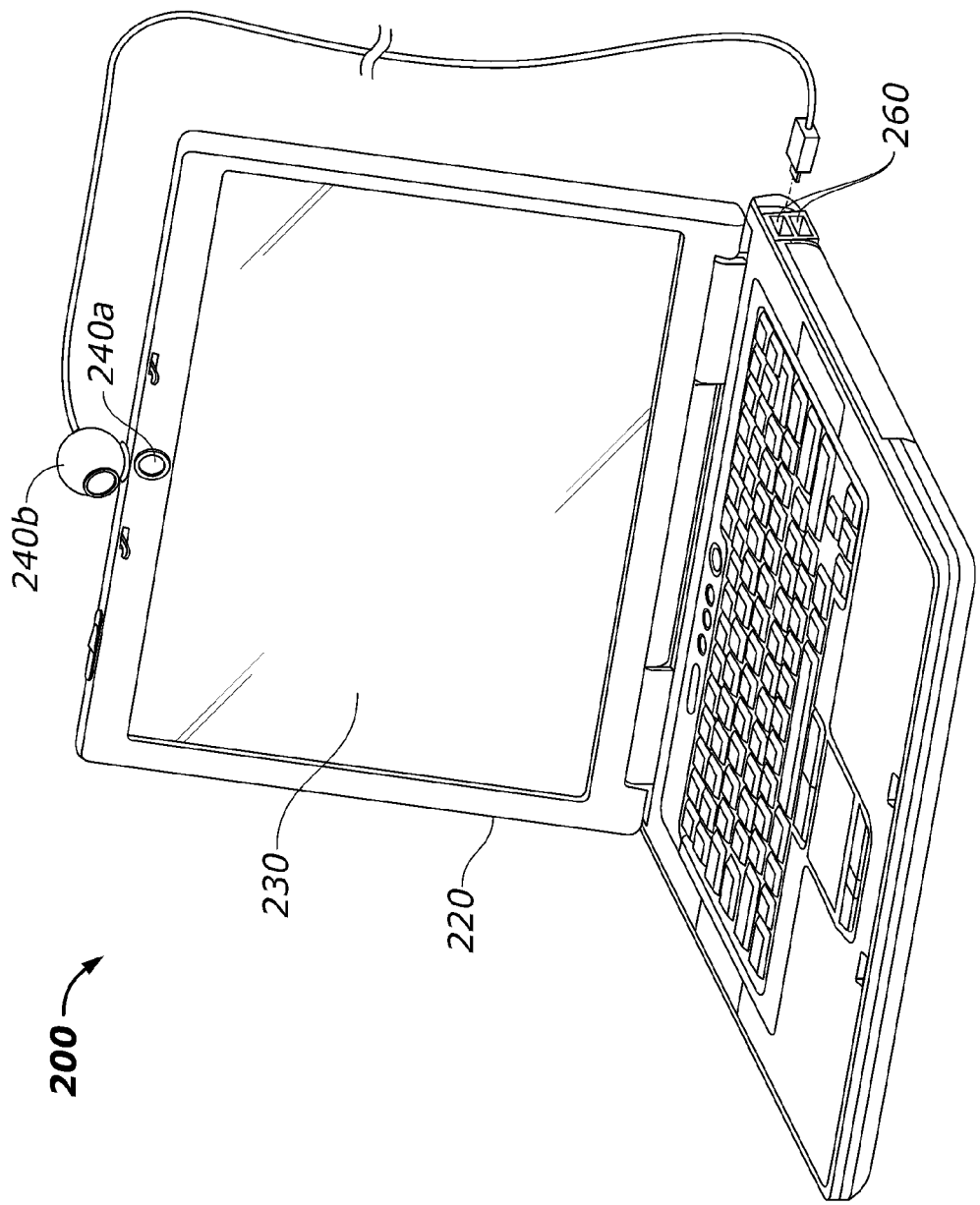
FIG. 2 represents a portable IHS in accordance with another aspect of the present disclosure.

FIG. 2 provides a schematic illustrating a portable IHS 200 in accordance with one aspect of the present disclosure. As depicted in FIG. 2, the IHS 200 may be a laptop or notebook, but it is understood that any kind of IHS is also contemplated within the present disclosure. Furthermore, the portable IHS 200 may include an image capturing device 240a-b, which may be any device operable to take images and/or video of any object or environment and thereby obtain visual data of the same. As such, image capturing devices 240a-b may include cameras, camcorders, webcams, and/or the like. Visual data may contain any information related to the image or video captured by the image capturing device 240a-b including, but not limited to, pixel data, camera angles, lighting, and aspect ratio.

As depicted tin FIG. 2, the image capturing device 240a-b may be embedded on the frame 220 of the display 230, such as in the case of an integrated camera. In another implementation, the image capturing device 240a-b may be a standalone device coupled to a port 260 of the IHS 200. While FIG. 2 depicts the port 260 as a Universal Serial Bus (USB) port, any other type of port or connection is also contemplated within the present disclosure.

In one implementation, the image capturing device 240a-b may be a webcam. A webcam may be a relatively low cost device used to capture images or visual data. As such, webcams may typically include a lens, an image sensor, and support electronics. The lens may be used to capture light or optical data while the image sensor may be employed to convert optical images into electrical data. Furthermore, the support electronics may refer to components that facilitate the transfer of the electrical data from the image sensor of the image capturing device 240a-b to other components of the IHS such as a video card, for example, in order to render the visual data on a display.

Figure 3:
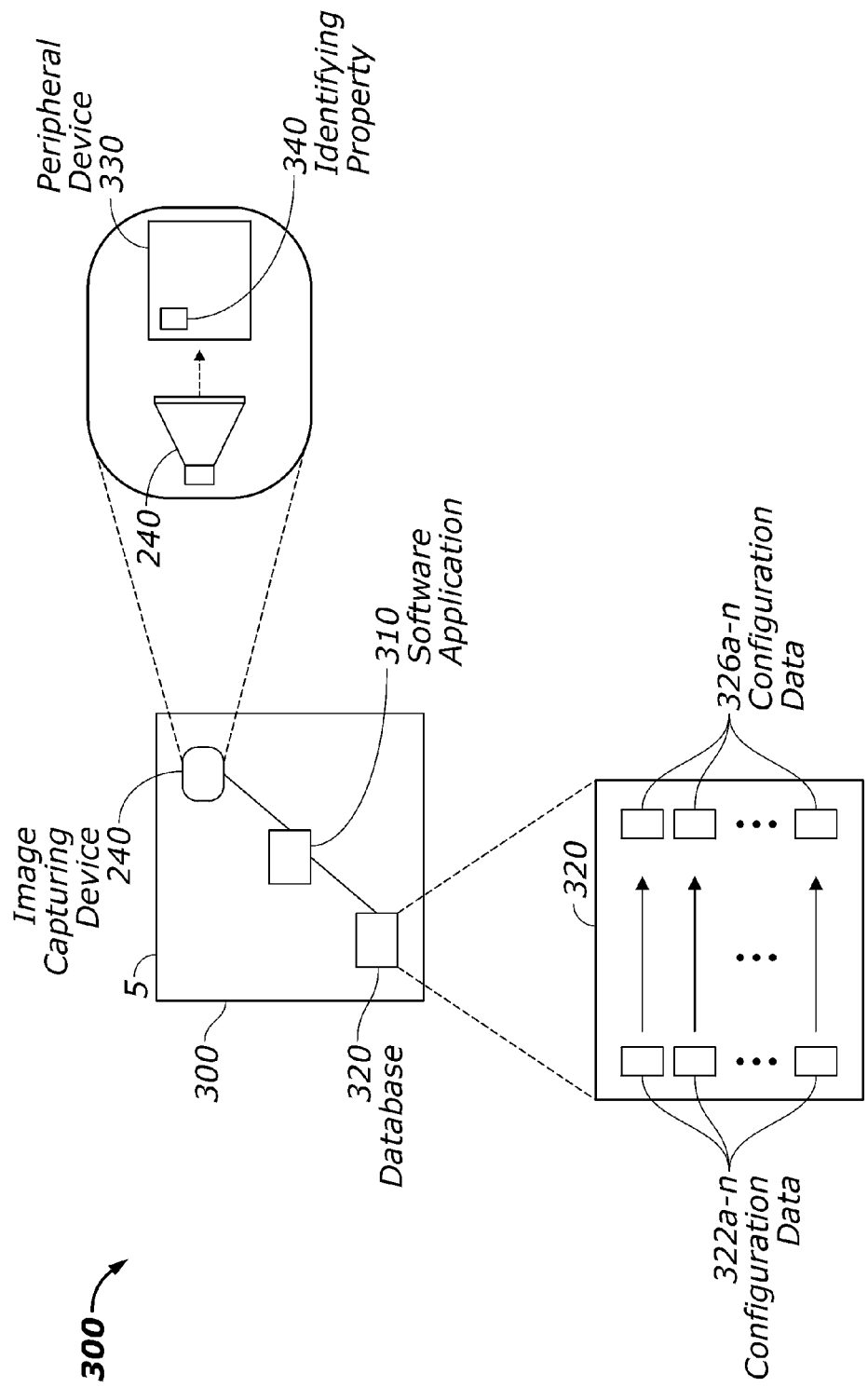
FIG. 3 represents a schematic illustrating a system for configuring a peripheral device with the IHS in FIG. 1.

Turning now to FIG. 3, a schematic is provided that illustrates a system for configuring a peripheral device with an IHS in accordance with one aspect of the present disclosure. As previously mentioned with respect to FIG. 2, the IHS may include an image capturing device 240a-b, which may be embedded on the IHS 5 itself or may be coupled to the IHS 5 in any other fashion such as a USB port or other type of port. The image capturing device 240a-b may be configured to capture an image of the peripheral device 330 and thereby obtain visual data associated with the image.

The peripheral device 330 may be any object that may be configured to or connected with the IHS 5. For example, the peripheral device may be, but is not limited to, a laptop/notebook, a personal display assistant (PDA), a cellular phone, an identification card, a credit card, a router, and/or any wireless device. It should be noted that the present disclosure is not limited to the aforementioned devices and that other implementations may include other peripheral devices 330.

In one implementation, the peripheral device may include an identifying property 340, and the visual data may contain data associated with the identifying property 340. The identifying property 340 may be any distinguishing characteristic of the peripheral device 330 including, but not limited to, barcodes, serial numbers, manufacturer icons, and/or even physical properties of the peripheral device 330 such as the measurements of a display or casing. Further still, the identifying property 340 may be a signal generated by the peripheral device 330. For example, the peripheral device 330 may include a display, and the device may generate pertinent information to be provided on the display such as make, model number, and/or the like. In other implementations, the peripheral device 330 may simply configure the display to flash a sequence of patterns that identify the peripheral device 330. Such patterns may correspond to any form of visual communication such as bar codes, Morse code, and/or the like.

It should be noted however, that the identifying property 340 may be an optional feature. To this end, the peripheral device 330 need not include the identifying property 340 in order for the image capturing device 240a-b to recognize the peripheral device 330. The identifying property 340 may be included in the illustration provided by FIG. 3 merely to indicate that the IHS 5, through the image capturing device 240a-b, may be capable of recognizing such an identifying property 340.

A software application 310 may be included in the IHS and may be operable to receive the visual data obtained by the image capturing device 240a-b. Additionally, the software application 310 may be stored in the memory of the IHS 5, such as the RAM, or any other storage medium (e.g., hard drives, computer readable mediums) and may employ any of a number of context-sensitive object recognition techniques or other vision processing technology. Furthermore, the software application 310 may be able to recognize certain devices in a variety of ways such as the device's general shape, or by an identifying property 340. For example, the software application 310 may be able to recognize that a peripheral device's 300 general shape corresponds to that of to a cellular phone and may therefore identify the peripheral device 330 as such.

Moreover, the software application 310 may be in communication with a database 320. The database may be stored on any storage device including, but not limited to, hard disks, computer-readable medium, memory, and/or tape disk drives. Furthermore, while FIG. 3 depicts the database as being stored within the IHS 5, it should be noted that the database, and therefore the storage device in which it may be stored, may be located anywhere such as on a remote network, e.g., the Internet. As illustrated in FIG. 3, the database 320 may include standard images 322a-n, and each standard image 322a-n may be associated with configuration data 326a-n.

The standard images 322a-n may be images corresponding to various peripheral devices 330. In one implementation, each standard image 322a-n may represent a specific, particular device, such as a specific model for example. As such, the standard images 322a-n for each peripheral device 330 may be provided by its respective manufacturer or vendor. In another implementation, the standard images 322a-n may instead generally represent a type of device. For example, all credit cards may be associated with the same standard image 322a-n, and similarly, all cellular phones may be associated with another standard image 322a-n.

Generally, the software application 310 may be operable to match visual data corresponding to the image of the peripheral device 330, obtained via the image capturing device 240a-b, with a standard image 322a-n in the database 320. In other words, the software application 310 may determine whether the visual data is substantially similar to the standard image 322a-n, and therefore identify the peripheral device 330. Thus, once the software application 310 receives the visual data corresponding to the peripheral device, the software application may search the database 320 for a standard image 322a-n matching the visual data. Since each standard image 322a-n may be associated with a configuration data 326a-n, the software application 310 may be operable to then map the configuration data 326a-n to the peripheral device 330. Therefore, after determining the appropriate configuration data 326a-n for the peripheral device 330, the peripheral device may then be connected to the IHS 5 using the configuration data 326a-n.

Additionally, visual data associated with the peripheral device 330 may change depending on how the peripheral device 330 may be placed in view of the image capturing device 240a-b. For example, the angle, lighting, and/or the like, of the visual data obtained from the image capturing device 240a-b may differ from that of the standard image 322a-n of the peripheral device 330 stored in the database 320. Therefore, in order to ensure that the visual data obtained from the image of the peripheral device 330 will appropriately match to the corresponding standard image 322a-n of the peripheral device 330, the software application 310 may also be configured to normalize the visual data before attempting to match it with a standard image 322a-n in the database 320. Normalizing the visual data may refer to adjusting the visual data, and therefore the image that is produced from the visual data, to better match with the standard image 322a-n in the database. For example, normalization may include, but is not limited to, adjusting the visual data's camera angle, aspect ratio, lighting, and/or even generally identifying certain elements of interest such as an identifying property 340. It should be noted that various applications that perform normalization are well known in the art, and therefore, any of these applications may be employed to normalize the visual data obtained by the image capturing device 240a-b.

Also, depending on the type of standard images 322a-n stored in the database 320, there may not be the one-to-one correspondence between standard images 322a-n and configuration data 326a-n as depicted in FIG. 3. For example, if the standard images 322a-n represent only a type of device, groups of configuration data 326a-n may be associated with each standard image 322a-n. Under this implementation, more information from the visual data may be needed to map the peripheral device 330 with the appropriate configuration data 326a-n. Such information may include an identifying property 340 and/or the like.

Furthermore, each of the configuration data 326a-n may be specific to the peripheral device 330 and may be used to couple the peripheral device 330 to the IHS 5. As such, configuration data 326a-n may refer to any data to facilitate such a connection including device drivers, pairing information, usernames, passwords, and/or the like. Therefore, through the framework previously described above, the IHS 5 may be operable to provide the appropriate configuration data 326a-n depending on the peripheral device 330. For example, suppose the peripheral device 330 is a Bluetooth cellular phone that desires, or that a user desires, to connect with the IHS 5. Bluetooth may be a wireless communications protocol for delivering data over short distance (e.g., approximately ten meters). As such, Bluetooth may be a widespread standard for many peripheral devices such as mice, keyboard, cellular phones, and the like. Furthermore, such devices may include the Bluetooth icon to indicate Bluetooth capabilities. In this scenario, the identifying property 340 of the peripheral device 330 may include the Bluetooth icon as well as a manufacturer's mark such as the model number of the device, e.g., Samsung D900.

In order to establish a connection with the IHS 5, the peripheral device 330 (i.e., the Bluetooth cellular phone) may be placed in view of the image capturing device 240*a-b*, e.g., by the user. To this end, any identifying property 340 that may be included on the peripheral device 330 may also be placed in view of the image capturing device 240*a-b*. Thus, the image capturing device 240*a-b* may obtain the visual data associated with the peripheral device 330 and any identifying property 340 and send the visual data to the software application 310. For Bluetooth devices, the identifying property 340 may be a Bluetooth icon or mark.

Subsequently, the software application 310 may search the database 320 for a standard image 322*a-n* matching the image taken by the image capturing device 240*a-b*, and map the configuration data 326*a-n* associated with the standard image 322*a-n* to the peripheral device 330. To this end, the configuration data 326*a-n* may be specific to the peripheral device 330, and in this particular scenario, may include Bluetooth configuration data to connect the Bluetooth cellular phone with the IHS 5. Therefore, in order to connect with a peripheral device 330, the IHS 5 may be operable to map configuration data 326*a-n* specific to the peripheral device 330 without the input of a user. In other words, the user may not need to manually search for and install the peripheral device's 330 configuration data.

In other implementations, the IHS may not need a database 320. For example, the peripheral device 330 may be another IHS such as a laptop or notebook desiring to wirelessly connect with the IHS 5 of FIG. 3. The peripheral device 330 may then flash a sequence of patterns in view of the IHS's 5 image capturing device 240*a-b*. Thus, in this scenario, the visual data may be the sequence of patterns. To this end, the sequence of patterns may represent bar codes, Morse code, or any other form of visual communication. Furthermore, various types of configuration data regarding connection information may be passed in this manner, including, but not limited to, instant messenger login information, Internet Protocol (IP) addresses, and wireless channels. Additionally, connecting the two IHS's in such a manner provides security benefits since a direct line of sight may be necessary to pass connection information. Furthermore, such connection information may be passed out-of-band, i.e., not in the wireless channels, through the visual medium via the sequence of patterns flashed by the peripheral device 330.

It should be noted that while FIG. 3 depicts the database 320 as including both the standard images 322*a-n* and their associated configuration data 326*a-n*, other implementations may contemplate a different framework. For example, the database 320 may be configured to only store the standard images 322*a-n*. Under this framework, the software application 310, after matching the visual data corresponding to the image of the peripheral device 330 with a standard image 322*a-n*, may then search a network e.g., the Internet, for the corresponding configuration data 326*a-n*. For instance, if the software application 310 identifies the peripheral device as a particular model made by a particular manufacturer, the software application may then proceed to the manufacturer's website to search for the appropriate configuration data 326*a-n* and map it to the peripheral device 330.

Figure 4:
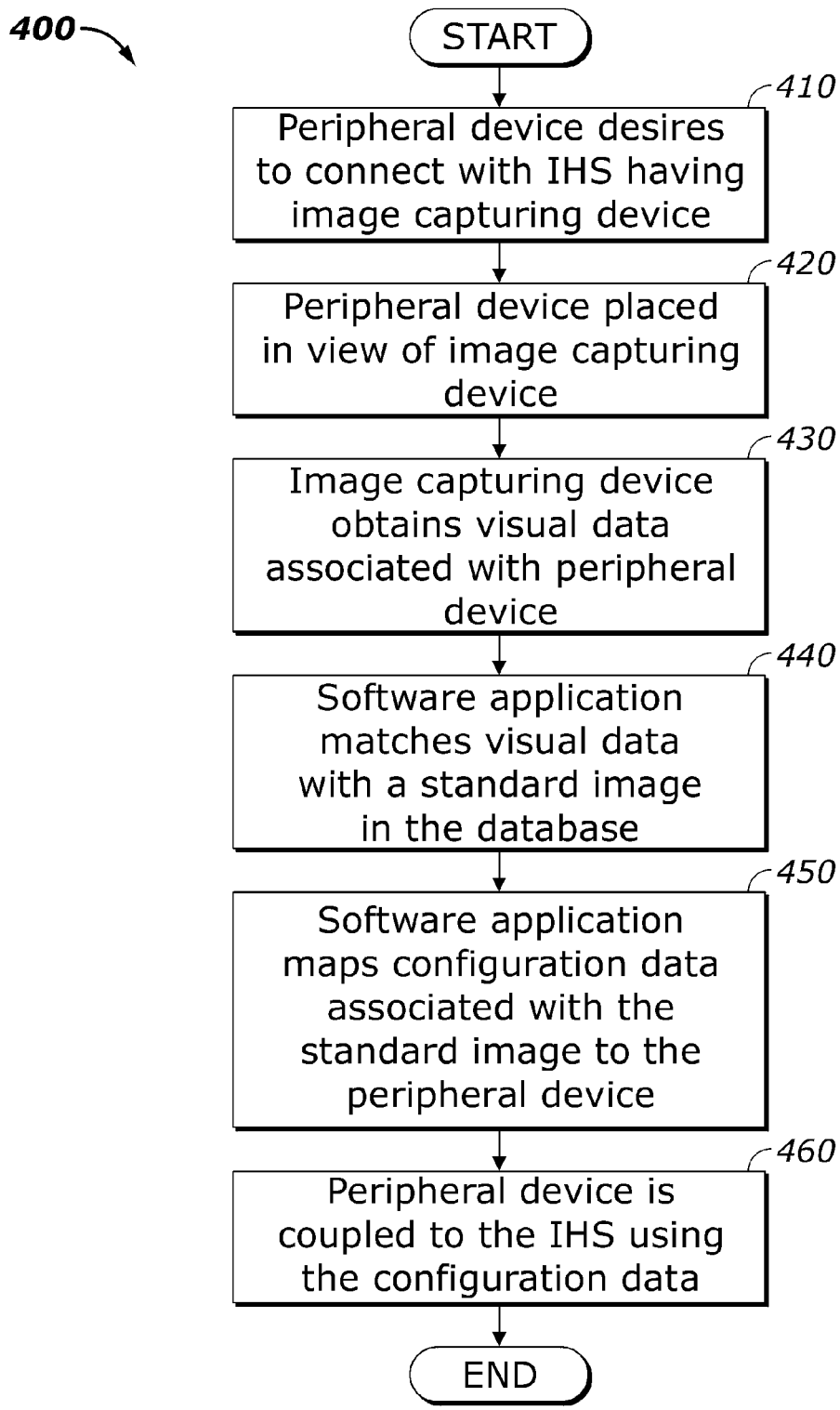
FIG. 4 provides a flow diagram illustrating a method for configuring a peripheral device with an IHS in accordance with one aspect of the present disclosure.

Turning now to FIG. 4, a flow diagram is provided that illustrates a method 400 for configuring a peripheral device with an IHS. The method 400 may begin in step 410, when a peripheral device desires to connect with an IHS having or coupled to an image capturing device. To this end, the peripheral device may be placed in view of the image capturing device, e.g., by a user in step 420. In this manner, the IHS may receive visual data associated with the peripheral device. As previously mentioned, the peripheral device may include an identifying property such as a manufacturer's mark, serial number, model number, and/or the like. Thus, the user may place the peripheral device such that the identifying property may be in view of the image capturing device.

In step 430, the image capturing device may obtain visual data associated with the peripheral device, and in certain implementations, the identifying property as well. Thus, the image capturing device may be said to take an image or a picture of the peripheral device. Next, in step 440, a software application stored in the IHS, i.e., in the memory, may receive the visual data from the image capturing device and search the database for a standard image corresponding to the peripheral device. As previously mentioned, the database may store standard images corresponding to various peripheral devices, and each standard image may also be associated with configuration data specific to a peripheral device.

Therefore, after the software application matches the visual data with the standard image in the database, the software application may then map the configuration data associated with the standard image to the peripheral device in step 450. Finally, in step 460, the peripheral device may be coupled to the IHS using the configuration data. That is, depending on the peripheral device, the method 400 may locate the appropriate configuration data so that the peripheral device may be coupled to the IHS and function accordingly. Such a coupling between the peripheral device and the IHS may be initiated by simply placing the peripheral device in view of the image capturing device.

Thus, the present disclosure may provide a system and method for configuring a peripheral device with an IHS. Furthermore, such configuration may be automatically performed with minimal user interaction and without the need for a specific type of identifier on the peripheral device though such an identifier may still be present. To this end, the peripheral device may be placed in view of an image capturing device, which may be coupled to or embedded on an IHS. The image capturing device may obtain visual data associated with the peripheral device while a software program may use such visual data to map an appropriate configuration data with the peripheral device. A connection may thereby be established between the IHS and the peripheral device using the configuration data.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for configuring a peripheral device in communication with an information handling system (IHS), the method comprising:
   receiving visual data associated with the peripheral device;
   matching the visual data associated with the peripheral device to a standard image in a database stored on a storage device of the IHS;
   mapping configuration data to the peripheral device based on the standard image; and
   utilizing the configuration data to configure the peripheral device, without input of a user, in communication with the IHS.

2. The method of claim 1, wherein receiving the visual data comprises receiving the visual data from an image capturing device in communication with the IHS, wherein the peripheral device is in view of the image capturing device.

3. The method of claim 2, wherein the image capturing device is a webcam.

4. The method of claim 1, wherein the peripheral device is associated with an identifying property.

5. The method of claim 4, wherein the identifying property is selected from a group consisting of a barcode, a serial number, a manufacturer icon or a physical measurement of the peripheral device.

6. The method of claim 1 further comprising normalizing the visual data to match with a standard image of the peripheral device, wherein the standard image is associated with the configuration data for the peripheral device.

7. The method of claim 1, wherein receiving visual data comprises receiving a sequence of patterns flashed by the peripheral device, wherein the sequence of patterns represents out-of-band connection information from the peripheral device.

8. The method of claim 1, wherein receiving visual data comprises receiving a sequence of patterns flashed by the peripheral device, wherein the sequence of patterns represents an identifying property associated with the peripheral device.

9. An information handling system (IHS) in communication with an image capturing device, the system comprising:
   a storage device operable to store a database stored on a storage device of the IHS, the database configured to store a standard image of a peripheral device, wherein the standard image is associated with configuration data for the peripheral device;
   a memory coupled to the storage device; and
   a processor to receive visual data associated with the peripheral device from the image capturing device and wherein the processor is operable to execute a software application configured to match the visual data with the standard image to configure the peripheral device, without input of a user, based on the configuration data.

10. The system of claim 9, wherein the image capturing device is a webcam.

11. The system of claim 9, wherein the image capturing device is configured to normalize the visual data associated with the peripheral device to match with the standard image.

12. The system of claim 9, wherein the peripheral device is associated with an identifying property.

13. The method of claim 12, wherein the identifying property is selected from a group consisting of a barcode, a serial number, a manufacturer icon or a physical measurement of the peripheral device.

14. A method for configuring a peripheral device in communication with an information handling system (IHS), the method comprising:
   receiving visual data, via a software application stored on a storage medium of the IHS, associated with the peripheral device;
   matching the visual data with a standard image of the peripheral device in a database stored on a storage device of the IHS, the software application in communication with the database, wherein the standard image is associated with configuration data for the peripheral device; and
   utilizing the configuration data to configure the peripheral device, without input of a user, in communication with the IHS.

15. The method of claim 14, wherein receiving the visual data comprises receiving the visual data from an image capturing device in communication with the IHS, wherein the peripheral device is in view of the image capturing device.

16. The method of claim 14 further comprising normalizing the visual data to match with the standard image of the peripheral device.

17. The method of claim 14, wherein receiving visual data comprises receiving a sequence of patterns flashed by the peripheral device, wherein the sequence of patterns represents out-of-band connection information from the peripheral device.

18. The method of claim 14, wherein the peripheral device is associated with an identifying property selected from a group consisting of a barcode, a serial number, and a manufacturer icon.

19. The method of claim 14, wherein the peripheral device is associated with an identifying property comprising a physical measurement of the peripheral device.

* * * * *